United States Patent [19]

Baker

[11] Patent Number: 5,405,350

[45] Date of Patent: Apr. 11, 1995

[54] FREEZE BRANDING APPARATUS WITH SWIVEL HANDLE

[76] Inventor: James D. Baker, LanderRoute, Rawlins, Wyo. 82031

[21] Appl. No.: 185,452

[22] Filed: Jan. 24, 1994

[51] Int. Cl.$^6$ .............................................. A01K 11/00
[52] U.S. Cl. ...................................... 606/116; 606/25
[58] Field of Search ...................... 403/DIG. 4, 41, 43, 403/119, 127; 606/1, 116, 117, 20–26; 128/DIG. 27; 62/293; 607/96

[56] References Cited

U.S. PATENT DOCUMENTS

| | | | |
|---|---|---|---|
| 3,358,648 | 12/1967 | Berens | 606/116 |
| 3,411,483 | 11/1968 | Canoy | 606/116 |
| 3,485,060 | 12/1969 | Ziegler | 606/116 |
| 3,515,096 | 6/1970 | Hogg | 606/116 |
| 4,531,476 | 7/1985 | Miller | 606/116 |
| 5,051,539 | 9/1991 | Wiessner | 403/164 |

*Primary Examiner*—Stephen C. Pellegrino
*Assistant Examiner*—Glenn Dawson
*Attorney, Agent, or Firm*—Dean P. Edmundson

[57] ABSTRACT

An apparatus for applying a freeze brand to the hide of an animal. The apparatus includes a source of cryogenic fluid (e.g., liquid nitrogen), a canister having an inlet and an outlet for cryogenic fluid, and a brand relief attached to the canister. A flexible insulated hose is connected between the source of fluid and the canister. Preferably the cryogenic fluid passes through a conduit extending through the length of the handle to the canister. A swivel is preferably included in the handle enabling the canister and brand relief to be easily turned or rotated as needed.

17 Claims, 3 Drawing Sheets

FREEZE BRANDING APPARATUS WITH SWIVEL HANDLE

FIELD OF THE INVENTION

This invention relates to apparatus and techniques for applying brands to the hides of live animals. More particularly, this invention relates to apparatus and systems for permanently branding the hides of animals using cryogenic fluid.

BACKGROUND OF THE INVENTION

Animals are typically branded for identification purposes by applying a very hot iron having the shape of the desired insignia to the hide of the animal until the hair cells are killed and the hide burned or scarred so that hair does not grow in that area. Not only is this technique very painful for the animals, but it permanently damages the hide. Consequently, when the animal is slaughtered, the branded hide has less commercial value than an unblemished hide.

Several years ago it was shown that the hide of an animal can be branded or marked using very cold (i.e., cryogenic) fluids. See, for example, U.S. Pat. No. 3,362,381. The cryogenic fluid may be applied directly to the hide in the desired pattern, or the fluid may be used to reduce the temperature of a suitable iron having the shape of the desired insignia which is then applied to the hide of the animal to be marked. It has been reported that temperatures as high as −30° C. are effective in freeze branding techniques.

When the cryogenic fluid (or an iron cooled by the fluid) is applied to a hide, the pigmentation in the hair and the skin is destroyed. As a result, white hair grows in the area of the applied insignia. The hide itself is not scarred or damaged by the process. Therefore, the hide retains its full commercial value when the animal is slaughtered.

Various types of apparatus have been previously used in freeze branding techniques. U.S. Pat. Nos. 3,515,096; 3,358,648; 3,568,464; 3,411,483; 3,485,060; 3,630,203; 4,531,476; and 4,787,385. U.S. Pat. Nos. 3,421,508 and 3,674,031 describe apparatus for use in cryogenic surgery. However, none of such patents describe freeze branding apparatus having the advantages provided by the present invention.

SUMMARY OF THE INVENTION

In accordance with the present invention there is provided improved freeze branding apparatus which is very convenient to use and which enables easy and simple changing of the brand insignia at the branding head.

In a preferred embodiment the freeze branding apparatus of the invention comprises:

(a) a handle member preferably having upper and lower portions connected by a swivel joint which enables the lower portion to be rotated relative to the upper portion;

(b) a canister member carried by the lower portion of the handle, wherein the canister member includes inlet and outlet means for ingress and egress of cryogenic fluid; and (c) brand insignia means carried by the canister member; wherein the brand insignia means comprises a desired brand relief, and wherein the brand relief is adapted to be cooled by cryogenic fluid in the canister member.

The apparatus of the invention is very easy and convenient to use and is very effective in applying a freeze brand to the hide of an animal. The cryogenic fluid flows continuously from a supply tank to the canister so that the brand insignia on the canister is maintained in a desired cooled condition at all times. This feature enables the application of freeze brands to a large number of animals to be performed efficiently, without having to wait for the brand insignia to be cooled in a separate step between each application.

Other advantages of the apparatus of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
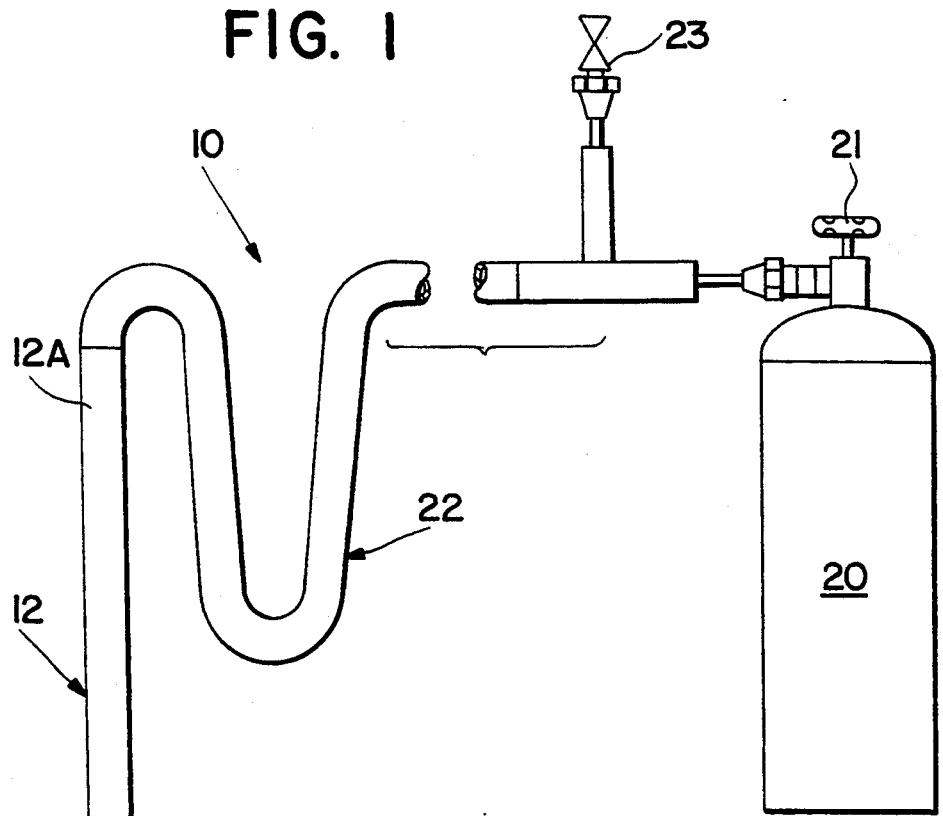
FIG. 1 is an elevational view illustrating one embodiment of freeze branding apparatus of the invention.
Figure 2:
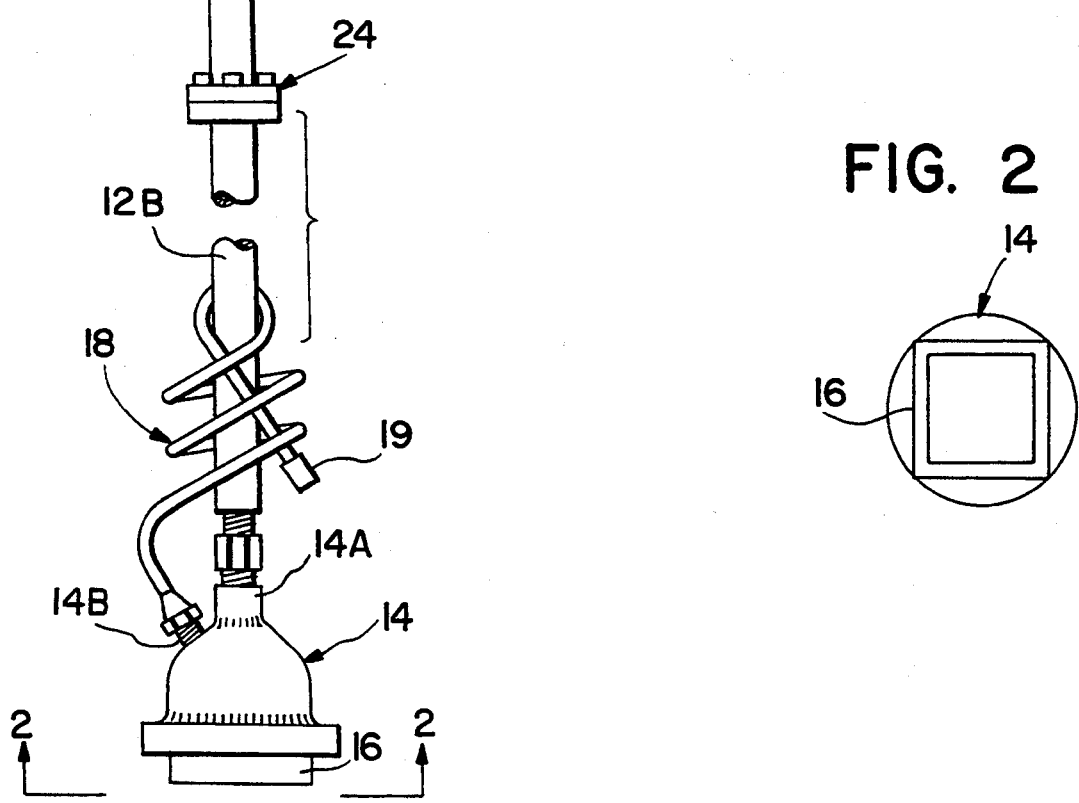
FIG. 2 is a bottom view of the canister and brand insignia means of the apparatus shown in FIG. 1.

In FIGS. 1 and 2 there is illustrated one embodiment of freeze branding apparatus 10 of the invention. The apparatus comprises an elongated handle member 12 secured at one end to a canister 14. Brand insignia means 16 is carried by the lower end of the canister. The insignia means 16 includes a desired relief pattern of the brand to be applied to the hide of a live animal. As an example, the relief pattern shown in FIG. 2 is for applying a box-shaped brand to an animal hide.

The tank 20 contains a source of cryogenic fluid for cooling the brand insignia means. A flexible, insulated hose or conduit 22 is operably connected between the tank and the outer end of handle 12. Valve 21 controls flow of fluid from the tank to the conduit 22. A pressure relief valve 23 is preferably included in the hose 22.

The canister 14 preferably comprises a tubular cylinder or bell-shaped housing for receiving cryogenic fluid from the tank via inlet 14A. Outlet port 14B enables the fluid to exit the canister to a vaporization coil 18 having a defuser or vent 19.

The brand insignia means, and thus the brand relief pattern, is cooled to the desired low temperature by the cryogenic fluid passing through the canister. In this manner the brand relief can be maintained at a fairly constant low temperature (e.g., −30° C. or less) which is required in order to apply a freeze brand to an animal hide.

Preferably the handle member includes an upper portion 12 and a lower portion 12B, as illustrated in FIG. 1. A conduit extends through the length of handle 12 for enabling flow of the cryogenic fluid through the handle to the inlet port 14A in the canister 14. It is also preferable for the handle to include a swivel joint 24 between the upper and lower portions of the handle. The swivel joint is shown in more detail in FIG. 3. The inclusion of the swivel joint is extremely advantageous because it enables the canister and brand insignia to be turned or rotated relative to the upper end of the handle. This feature thus greatly facilitates the use of the apparatus in applying brands to an animal with the desired orientation and placement of the brand on the hide. This is especially important when using the angle numeral branding system where proper orientation of each brand character is critical. See U.S. Pat. No. 3,633,584.

Accordingly, when the swivel joint is included in the handle, the canister and the brand insignia can be easily turned or rotated so that the brand is properly oriented on the animal, without being restricted by the hose 22. If the swivel joint is not included, it is necessary to rotate or turn the entire handle and the hose in order to provide the proper orientation of the brand relative to the animal. This can be very cumbersome and restrictive due to twisting and tangling of the hose.

Figure 3:
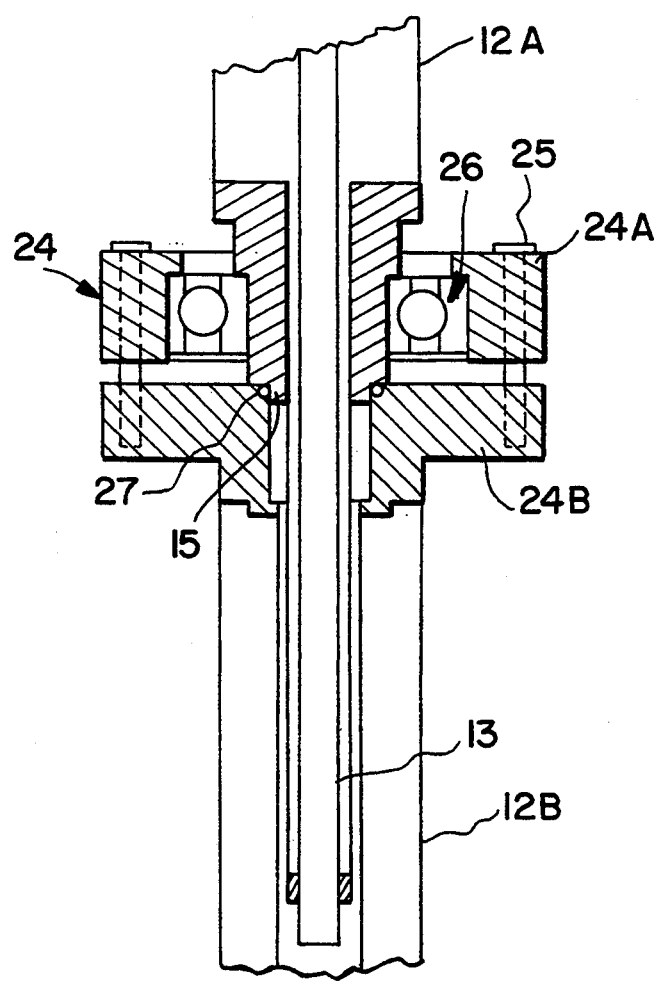
FIG. 3 is a cut-away view illustrating one form of swivel joint which is useful in the apparatus of this invention.

A preferred swivel joint is shown in FIG. 3 and is commercially available from International Cryogenics, Inc. as a rotary bayonet swivel joint and it includes sections 24A and 24B which are held together by screws 25. The stem 13 for carrying cryogenic fluid through handle portion 12A to handle portion 12B extends into the upper end of handle portion 12B as shown. Fitting 15 is secured to handle portion 12A and includes an O-ring 27 near its lower end where fitting 15 is seated against section 24B. Roller bearing 26 in section 24A enables the swivel to rotate freely around fitting 15. Thus, the lower handle portion 12B is permitted to rotate around fitting 15 on the upper handle portion without loss of cryogenic fluid through the swivel joint. Other equivalent swivel joints could also be used. It is also possible to include more than one swivel joint in the apparatus, if desired.

Figure 4:
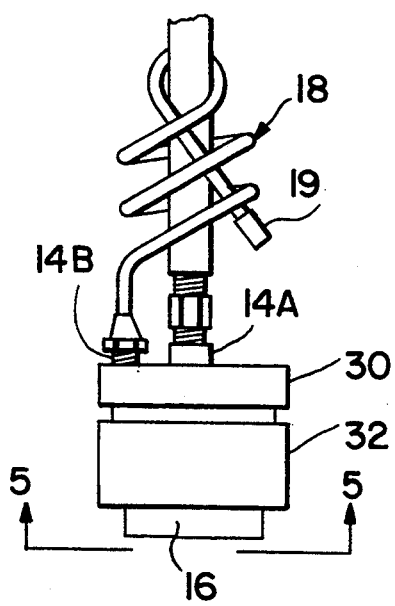
FIG. 4 is a side elevational view of another embodiment of apparatus with another type of canister and brand insignia means used herein.
Figure 5:
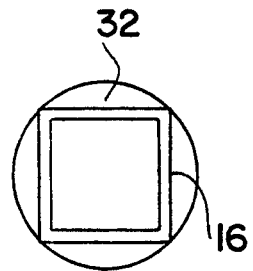
FIG. 5 is a bottom view of the lower portion of the canister of FIG. 4.
Figure 6:
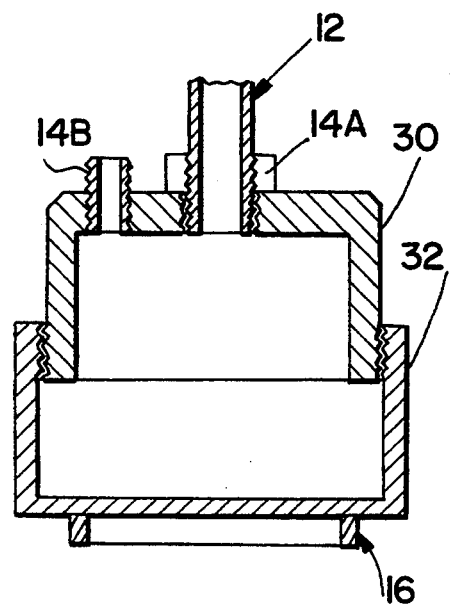
FIG. 6 is a cross-sectional view of the canister used in the embodiment shown in FIG. 4.

If desired, the canister may be a cylindrical body 30 whose lower end is threaded, as shown in FIGS. 4–6. In this embodiment the brand insignia means is also a cylindrical body or cap 32 which includes a threaded upper portion so that the cap can be threadably coupled to the canister 30. This is extremely advantageous because it enables changing the brand relief pattern very simply. All that is required is to rotate the cap 32 until it is decoupled from the canister 30. Then another cap carrying another desired brand relief pattern can be threaded onto the canister. No other change in the apparatus is required. Other means for detachably coupling the cap 32 to the canister 30 may be used, if desired.

The brand relief pattern on the lower face of the canister or the cap can be comprised of any desired material which is durable and dimensionally stable at the very cold temperatures required in order to apply a freeze brand to the hide of an animal. Typically the brand relief pattern comprises steel (e.g., stainless steel) bar material of the desired shape which is welded to the bottom face of the canister or cap. The bar material may be any desired thickness and may project outwardly from the generally planar face of the canister any desired distance (e.g., 0.25 inch).

The tubing or conduit 22 used in the apparatus of this invention is conventional. A preferred type of flexible conduit is commercially available as vacuum insulated pipe ("VIP" from MV Engineering). It is composed of stainless steel. Other types of flexible conduit may also be used. The conduit may be insulated if desired.

The type of cryogenic fluid used in the apparatus of this invention may vary so long as it is capable of flowing from the tank to the canister to cool the brand relief pattern to the desired low temperature necessary to effect a freeze brand. Typically the cryogenic fluid comprises liquid nitrogen which flows readily through the conduit to the canister member. Other conventional cryogenic fluids (e.g., liquid air, etc.) could also be used.

It is also possible for the conduit for the cryogenic fluid to be secured along the outside of the handle, with a swivel joint or coupler in the flexible conduit.

Other variations are possible without departing from the scope of the invention. For example, if a small tank or container is used for the cryogenic fluid, the container may be secured to and carried by the handle so that the apparatus is wholly self-contained. The hair in the area of the hide to be branded should be clipped so as to assure good contact of the brand relief pattern with the hide. Alcohol or other such fluid may be applied to the hide at the time of branding to facilitate cold transfer during application of the iron to the hide. The length of time that the brand insignia pattern is held against the animal hide may be varied, as necessary.

What is claimed is:

1. A freeze branding apparatus comprising:
   (a) a handle member having upper and lower portions connected by a swivel joint which enables said lower portion to be rotated relative to said upper portion;
   (b) a canister member carried by said handle member; wherein said canister member comprises an enclosed cylindrical tubular member having upper and lower ends and including inlet and outlet means for ingress and egress of cryogenic fluid; wherein said upper end is threadably connected to said lower portion of said handle member; and
   (c) brand insignia means carried by said canister member; wherein said brand insignia means comprises a brand relief; and wherein said brand relief is adapted to be cooled by cryogenic fluid in said canister member.

2. A freeze branding apparatus in accordance with claim 1, wherein said brand insignia means is threadably connected to said lower end of said tubular member.

3. A freeze branding apparatus in accordance with claim 1, wherein said brand insignia means includes a lower face; and wherein said brand relief is carried by said lower face.

4. A freeze branding apparatus in accordance with claim 1, further comprising a vaporization coil operably connected to said outlet means.

5. A freeze branding apparatus in accordance with claim 1, further comprising conduit means within said handle member for passage of cryogenic fluid through said handle member to said inlet means.

6. A freeze branding apparatus in accordance with claim 5, further comprising a source of cryogenic fluid operably connected to said conduit means.

7. A freeze branding apparatus in accordance with claim 6, further comprising a flexible insulated hose connected between said conduit means and said source of cryogenic fluid.

8. A system for applying a freeze brand to the hide of an animal, said system comprising:

(a) a source of cryogenic fluid;

(b) a canister member including inlet and outlet means for ingress and egress of cryogenic fluid from said source; wherein said canister member comprises an enclosed cylindrical tubular member having upper and lower ends; wherein said upper end is threaded;

(c) handle means threadably secured to said upper end of said canister member and including a conduit communicating with said inlet means in said canister member;

(d) a flexible insulated hose connected between said source of cryogenic fluid and said conduit;

(e) swivel means between said hose and said canister member; and (f) brand insignia means detachably connected to said canister member; wherein said brand insignia means comprises a brand relief; and wherein said brand relief is adapted to be cooled by cryogenic fluid in said canister member.

9. A system in accordance with claim 8, wherein said brand insignia means is threadably attached to said lower end of said tubular member.

10. A system in accordance with claim 8, wherein said brand insignia means includes a lower face; and wherein said brand relief is carried by said lower face.

11. A system in accordance with claim 8, further comprising a vaporization coil operably connected to said outlet means.

12. A system in accordance with claim 8, wherein said swivel means is disposed in said handle means.

13. A system in accordance with claim 12, wherein said handle means comprises upper and lower portions, and wherein said swivel means is disposed between said upper and lower portions.

14. A freeze branding apparatus comprising:
(a) a source of cryogenic fluid;
(b) a canister member including inlet and outlet means for ingress and egress of cryogenic fluid from said source; wherein said canister member comprises an enclosed cylindrical tubular member having upper and lower ends; wherein said upper end is threaded;
(c) brand insignia means connected to said lower end of said tubular member; wherein said brand insignia means comprises a brand relief; and wherein said brand relief is adapted to be cooled by cryogenic fluid in said canister member;
(d) a handle member threadably attached at one end to said upper end of said canister member.

15. A freeze branding apparatus in accordance with claim 14, wherein said lower end of said tubular member is threaded, and wherein said brand insignia means comprises a threaded portion which is threadably attached to said lower end of said tubular member.

16. A freeze branding apparatus in accordance with claim 14, wherein said handle member includes a conduit for flow of cryogenic fluid therethrough to said canister member.

17. A freeze branding apparatus in accordance with claim 16, further comprising a flexible insulated hose connected between said source of cryogenic fluid and said handle member.

* * * * *